United States Patent

Tanaka et al.

[11] Patent Number: 5,575,542
[45] Date of Patent: Nov. 19, 1996

[54] VEHICLE BRAKING FORCE CONTROLLER

[75] Inventors: Hirohisa Tanaka; Kazuhiro Kato; Youichi Miyawaki, all of Itami, Japan

[73] Assignee: Sumitomo Electric Industries, Ltd., Osaka, Japan

[21] Appl. No.: 524,641

[22] Filed: Sep. 8, 1995

[30] Foreign Application Priority Data

Sep. 20, 1994 [JP] Japan .................................. 6-224668

[51] Int. Cl.$^6$ ...................................................... B60T 8/32
[52] U.S. Cl. ......................... 303/125; 180/167; 180/170; 180/271; 303/155; 303/177
[58] Field of Search ..................... 303/177, 155, 303/3, 164, 165, DIG. 3, DIG. 4, 20, 171, 156, 157, 178, 183, 185, 186, 189, 191, 199, 172, 176, 135, 125, 126, 127, 158; 364/426.01, 426.02, 426.03, 424.02; 180/271, 275, 167, 168, 169, 170

[56] References Cited

U.S. PATENT DOCUMENTS

| | | | |
|---|---|---|---|
| 3,192,382 | 6/1965 | Allison | 303/125 |
| 4,512,615 | 4/1985 | Kita et al. | 303/155 |
| 4,633,757 | 1/1987 | Kubota | 303/155 |
| 4,787,683 | 11/1988 | Singleton | 303/127 |
| 5,031,968 | 7/1991 | Takata | 303/155 |
| 5,169,215 | 12/1992 | Takata | 303/155 |
| 5,236,252 | 8/1993 | Phipps | 303/DIG. 4 |
| 5,257,857 | 11/1993 | Okazaki | 303/163 |
| 5,286,099 | 2/1994 | Fujita et al. | 303/125 |
| 5,322,352 | 6/1994 | Ohno et al. | 303/20 |
| 5,333,944 | 8/1994 | Shirai et al. | 303/177 |
| 5,375,917 | 12/1994 | Inagaki et al. | 303/154 |
| 5,474,369 | 12/1995 | Inagaki et al. | 303/155 |

FOREIGN PATENT DOCUMENTS

| | | |
|---|---|---|
| 5-105045 | 4/1993 | Japan . |
| 5-310109 | 11/1993 | Japan . |
| 6-312654 | 11/1994 | Japan . |

OTHER PUBLICATIONS

English Language Abstract of JP-5-105045.
English Language Abstract of JP-6-312654.
English Language Abstract of JP-5-310109.

*Primary Examiner*—Douglas C. Butler
*Attorney, Agent, or Firm*—Greenblum & Bernstein P.L.C.

[57] ABSTRACT

A vehicle braking force controller for controlling braking force of a vehicle by changing brake fluid pressure effected by a fluid pressure controller has a deceleration detector and a computer. The computer calculates a vehicle deceleration, a target deceleration of the vehicle, and a pressure adjustment speed at which the brake fluid pressure increases or decreases using the target deceleration and the vehicle deceleration. The pressure adjustment speed calculator calculates the brake fluid pressure adjustment speed using a brake fluid pressure adjustment volume which is proportional to a difference between the detected vehicle deceleration and the calculated target deceleration, and a target tracking time representing a time required to adjust the brake fluid pressure with the pressure adjustment volume. The computer controls the brake fluid pressure according to the pressure adjustment speed. Thus, the vehicle braking force controller quickly starts the deceleration so that the actual vehicle deceleration does not overshoot the target deceleration.

5 Claims, 13 Drawing Sheets

VEHICLE BRAKING FORCE CONTROLLER

BACKGROUND OF THE INVENTION

1. Field of the invention

The present invention relates to a vehicle braking force controller for detecting the actual deceleration of a vehicle and controlling the braking force of the vehicle to decrease the difference between the actual vehicle deceleration and a target deceleration value. For example, the present invention to a brake fluid pressure control means for unmanned vehicles which operate according to a predefined acceleration and deceleration pattern, with acceleration and deceleration remotely controlled, or with computer-controlled acceleration and deceleration, or to a brake fluid pressure control means for collision avoidance control based on the velocity of the controlled vehicle and the distance between the controlled vehicle and the vehicle therebefore.

2. Description of the prior art

The vehicle braking force control method of a vehicle collision avoidance system similar to the present invention is described in Japanese patent "kokai" number H5-105045 (1993-105045). In the vehicle braking force control method described therein, a deceleration value close to the actual vehicle deceleration is calculated by obtaining the average variance of the deceleration values calculated from plural sensors, including acceleration/deceleration sensors, to accurately control the fluid pressure of hydraulic brakes. It is therefore possible, by means of this method, to soften the braking shock before the vehicle stops.

This method, however, effectively controls the increase or decrease in the brake fluid pressure at a constant rate irrespective of the difference between the detected vehicle deceleration and the calculated target deceleration. The problem with this technique, therefore, is that the precision of braking force control can deteriorate or fluctuate, because a certain amount of time is required for control to take effect, and the constant rate of fluid pressure control can cause the actual vehicle deceleration to overshoot the target deceleration.

SUMMARY OF THE INVENTION

Therefore, an object of the present invention is to provide a vehicle braking force controller whereby the start of deceleration occurs earlier than in the prior art, so that the actual vehicle deceleration does not overshoot the target deceleration.

To achieve this object, a vehicle braking force controller according to the present invention comprises a deceleration detector for detecting and outputting the vehicle deceleration; a target deceleration calculator for calculating the target deceleration of the vehicle; a pressure adjustment speed calculator for calculating the speed at which the brake fluid pressure increases or decreases (the pressure adjustment speed) from the calculated target deceleration and the detected vehicle deceleration; and a fluid pressure controller drive means for controlling the operation of the fluid pressure controller, which controls the brake fluid pressure according to the pressure adjustment speed. The vehicle braking force controller is characterized by a pressure adjustment speed calculator which calculates the brake fluid pressure adjustment speed from the brake fluid pressure adjustment volume required to cancel the difference between the detected vehicle deceleration and the calculated target deceleration, and the target tracking time required to adjust the brake fluid pressure according to the required pressure adjustment volume.

A vehicle braking force controller according to the second embodiment of the invention is a vehicle braking force controller according to the first embodiment wherein the pressure adjustment speed calculator further comprises a means for setting the pressurization rate at or above a predetermined value from the start of brake fluid pressurization by the brake control system for as long as predetermined conditions are satisfied.

A vehicle braking force controller according to the third embodiment of the invention is a vehicle braking force controller according to the first embodiment wherein the pressure adjustment speed calculator further comprises means for determining to hold the brake fluid pressure when the absolute value of the difference between the detected vehicle deceleration and the calculated target deceleration is less than or equal to a predetermined value.

A vehicle braking force controller according to the fourth embodiment of the invention comprises a deceleration detector for detecting and outputting the vehicle deceleration; a target deceleration calculator for calculating the target deceleration of the vehicle; a brake fluid pressure detector for detecting the brake fluid pressure of the wheels; a pressure adjustment speed calculator for calculating the speed at which the brake fluid pressure increases or decreases (the pressure adjustment speed) from the calculated target deceleration and the detected vehicle deceleration; and a fluid pressure controller drive means for controlling the operation of the fluid pressure controller, which controls the brake fluid pressure according to the pressure adjustment speed. This vehicle braking force controller is characterized by the pressure adjustment speed calculator setting the pressurization rate at or above a predetermined value from the start of brake fluid pressurization by the brake control system until the brake fluid pressure detected by the brake fluid pressure detector reaches a fluid pressure setting PA set according to the target deceleration.

The brake fluid pressure adjustment speed is calculated from the target tracking time and the brake fluid pressure adjustment volume required to cancel the difference between the detected vehicle deceleration and the calculated target deceleration by means of a vehicle braking force controller according to the first embodiment of the present invention. As a result, the responsiveness of vehicle deceleration can be improved by increasing the brake fluid pressure adjustment speed when the target deceleration changes suddenly, and the brake fluid pressure adjustment speed can be reduced to reduce overshooting the targeted vehicle deceleration when the vehicle deceleration approaches the target deceleration.

By means of a vehicle braking force controller according to the second embodiment of the present invention, the pressure adjustment speed calculator sets the pressurization rate at or above a predetermined value from the start of brake fluid pressurization by the brake control system until predetermined conditions are satisfied. As a result, the responsiveness of vehicle deceleration, when brake fluid pressure control begins, can be improved, and the brake fluid pressure adjustment speed can be reduced to reduce overshooting the targeted vehicle deceleration when predetermined conditions are satisfied.

By means of a vehicle braking force controller according to the third embodiment of the present invention, the pressure adjustment speed calculator causes the brake fluid pressure to be held when the absolute value of the difference between the detected vehicle deceleration and the calculated target deceleration is less than or equal to a predetermined value. The brake fluid pressure is therefore held when the detected vehicle deceleration approaches the target deceleration, thereby reducing overshooting of the targeted vehicle deceleration, and the responsiveness of vehicle deceleration can be improved by increasing the brake fluid pressure adjustment speed when the absolute value of the difference between the detected vehicle deceleration and the calculated target deceleration exceeds a predetermined value.

By means of a vehicle braking force controller according to the fourth embodiment of the present invention, the pressure adjustment speed calculator sets the pressurization rate at or above a predetermined value from the start of brake fluid pressurization by the brake control system until the brake fluid pressure detected by the brake fluid pressure detector reaches a fluid pressure setting PA set according to the target deceleration. As a result, the responsiveness of vehicle deceleration, when brake fluid pressure control begins, can be improved, and overshooting the targeted vehicle deceleration can be reduced by reducing the brake fluid pressure adjustment speed when and after predetermined conditions are satisfied.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
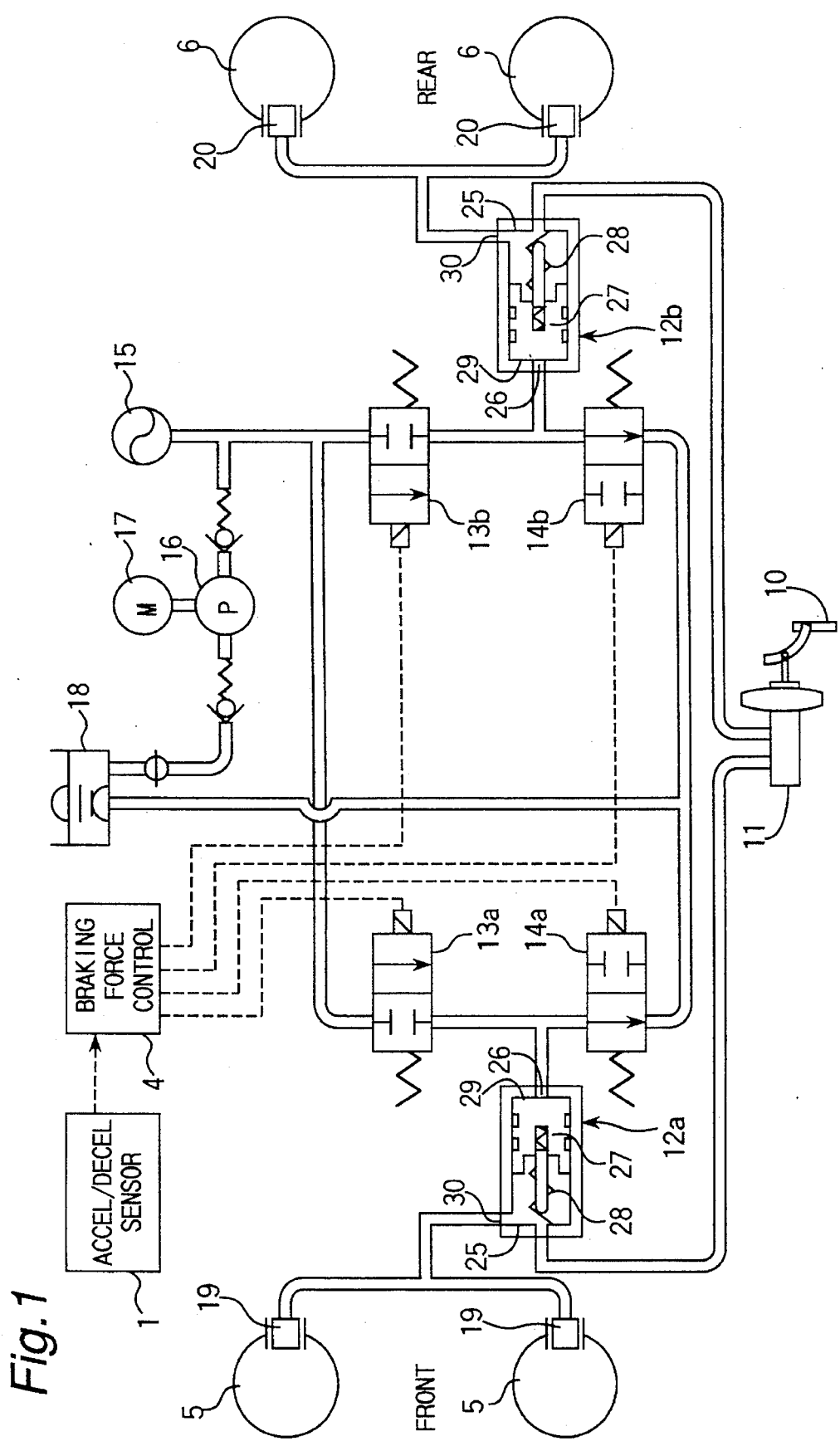
FIG. 1 is a simple system diagram of a vehicle braking force control system applying the vehicle braking force controller of the first embodiment of the invention in a four-wheeled vehicle.
Figure 2:
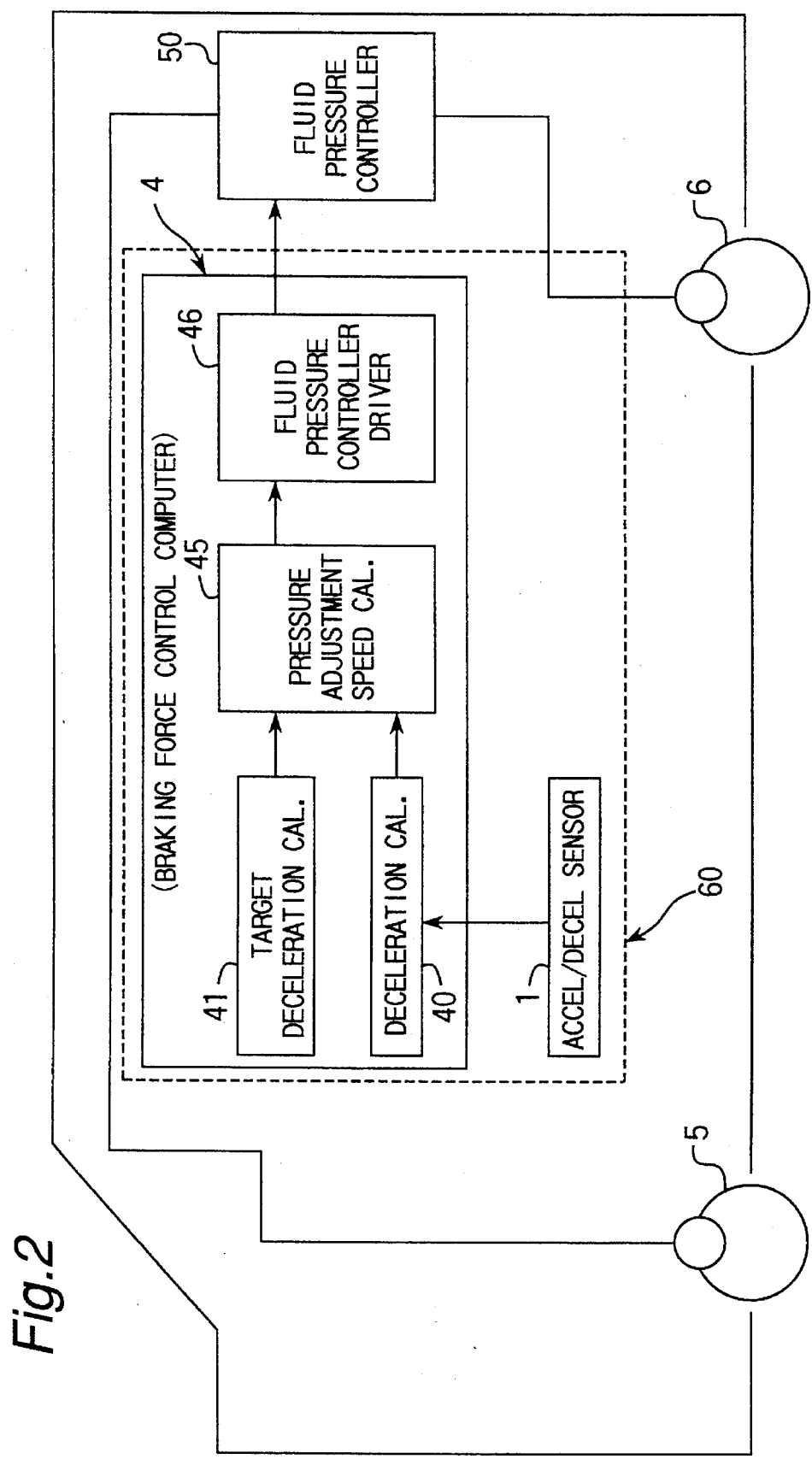
FIG. 2 is a block diagram of a vehicle braking force controller according to the first embodiment of the present invention.

The preferred embodiments of a vehicle braking force controller according to the invention are described below with reference to the accompanying figures, of which FIG. 1 is a simple system diagram of a vehicle braking force control system applying the vehicle braking force controller of the first embodiment of the invention in a four-wheeled vehicle, and FIG. 2 is a block diagram of a vehicle braking force controller according to the first embodiment of the present invention.

Referring to FIG. 1, the braking force control computer 4 is connected to a sensor 1 functioning as the acceleration/deceleration detector for detecting and outputting the vehicle acceleration or deceleration. The braking force control computer 4 is also connected to normally-closed IN solenoid valves 13a and 13b, and normally-open OUT solenoid valves 14a and 14b, and calculates the brake fluid pressure control command value for controlling the drive of solenoid valves 13a, 13b, 14a and 14b. The brake fluid pressure control command value is a control signal which is calculated based on the signal data from the sensor 1 for increasing, decreasing, or holding the brake fluid pressure. Also shown are the front wheels 5 and rear wheels 6.

The cylindrically shaped fluid pressure control valves 12a and 12b for controlling the brake fluid pressure each comprise on one open end thereof a seat 25 having input/output ports for the brake fluid, and input/output ports 26 on the other open end. Internally disposed to the fluid pressure control valves 12a and 12b are a piston 27; a spring 28 disposed between the seat 25 and the piston 27 for adjusting the movement of the piston 27; and a fluid pressure control chamber 29 the internal volume of which varies with the movement of the piston 27, and which includes the input/output ports 26. An input/output port 30 is disposed in the side near the seat 25 perpendicular to the stroke axis of the piston 27.

The input/output port of the seat 25 in each of the fluid pressure control valves 12a and 12b is connected to the master cylinder 11. The front wheel brake wheel cylinders 19 are interconnected and simultaneously connected to the input/output port 30 of the corresponding fluid pressure control valve 12a. The rear wheel brake wheel cylinders 20 are similarly interconnected and simultaneously connected to the input/output port 30 of the corresponding fluid pressure control valve 12b.

One IN solenoid valve 13a and one OUT solenoid valve 14a are also interconnected, and the link therebetween is connected to the input/output port 26 of the fluid pressure control chamber 29 of the fluid pressure control valve 12a.

Likewise on the rear wheel side, one IN solenoid valve 13b and one OUT solenoid valve 14b are interconnected, and the link therebetween is connected to the input/output port 26 of the fluid pressure control chamber 29 of the fluid pressure control valve 12b.

The other sides of the OUT solenoid valves 14a and 14b are also interconnected with the link therebetween connected to the reservoir 18 of the hydraulic unit. The other sides of the IN solenoid valves 13a and 13b are similarly interconnected with the link therebetween connected to the accumulator 15. The accumulator 15 is connected through a backflow prevention valve to a high pressure pump 16 driven by a pump motor 17. The high pressure pump 16 is in turn connected through a backflow prevention valve to the reservoir 18.

In the system thus comprised, the IN solenoid valves 13a and 13b are closed and the OUT solenoid valves 14a and 14b are open when braking force control is not applied. The fluid pressure control chambers 29 will be pressure free, and the pistons 27 are therefore separated from the seats 25 by the force of the springs 28. As a result, the brake fluid pressure generated in the master cylinder 11 by pressing the brake pedal 10 is transferred directly to the brake wheel cylinders 19 and 20.

When braking force control is applied, the braking force control computer 4 excites the solenoids of the OUT solenoid valves 14a and 14b to close each valve, and excites the solenoids of the IN solenoid valves 13a and 13b as necessary to open each valve, thereby introducing the required amount of high pressure brake fluid stored in the accumulator 15 to the fluid pressure control chambers 29 in the fluid pressure control valves 12a and 12b. As a result, the pistons 27 move toward the seats 25, closing the input/output ports of the seats 25. As the pistons 27 move further in the direction of the seats 25, the brake fluid between the pistons 27 and the seats 25 is forced out to the corresponding brake wheel cylinders from the input/output ports 30, and the brake fluid pressure of the corresponding brake wheel cylinders 19 and 20 rises.

When the braking force control computer 4 interrupts excitation of the solenoids in the IN solenoid valves 13a and 13b, the valves close, in-flow and out-flow of brake fluid to/from the brake wheel cylinders 19 and 20 stops, and the brake fluid pressure is held constant.

When excitation of the solenoids of the IN and OUT solenoid valves 13a, 13b and 14a, 14b is interrupted, the brake fluid in the fluid pressure control chambers 29 is drained from the respective input/output ports 26 through the corresponding OUT solenoid valve 14a or 14b to the reservoir 18. The pistons 27 are also moved toward the input/output port 26 by the force of the spring 28, thereby drawing brake fluid from the corresponding brake wheel cylinders through the input/output ports 30 between the piston 27 and seat 25, and lowering the brake fluid level in each brake wheel cylinder. When the pistons 27 move further, the input/output ports of the seats 25 open, and the initial pre-control state is resumed.

As described above, the braking force control computer 4 thus effectively monitors the detected vehicle deceleration obtained from the deceleration sensor 1 and the calculated deceleration to finely adjust the brake fluid pressure in each brake wheel cylinder.

It is to be noted that when the brake pedal 10 is operated during braking force control by the vehicle braking force controller described above, the input/output ports of the seats 25 are closed and brake fluid cannot flow from the master cylinder 11 to the brake wheel cylinders 19 and 20 insofar as the brake fluid pressure of the master cylinder 11 does not exceed the brake fluid pressure of the brake wheel cylinders 19 and 20 obtained by the braking force controller. However, if the fluid pressure of the master cylinder 11 exceeds the brake fluid pressure of the brake wheel cylinders 19 and 20 obtained by the braking force controller, the seat 25 functions as a check valve allowing the brake fluid in the master cylinder 11 to flow to the brake wheel cylinders 19 and 20. As a result, the brakes will continue to respond to increased pressure on the brake pedal 10.

The first embodiment of the vehicle braking force controller according to the present invention used in the vehicle braking force control system shown in FIG. 1 is described next below with reference to FIG. 2. Note that like parts are referenced by like reference numbers in FIGS. 1 and 2, and further description of such like parts is omitted below.

Referring to FIG. 2, the fluid pressure controller 50 adjusts or holds the brake fluid pressure by means of the fluid pressure controller valves and solenoid valves as shown in FIG. 1. For simplicity, these are treated as a single device below. The braking force controller 60 comprises the deceleration sensors 1 and braking force control computer 4 described above.

The braking force control computer 4 calculates and outputs the brake fluid pressure control command value, which is the control signal output to the fluid pressure controller 50, from the signal data received from deceleration sensor 1.

The braking force control computer 4 comprises a deceleration calculator 40, target deceleration calculator 41, pressure adjustment speed calculator 45, and fluid pressure controller driver 46. The deceleration calculator 40 calculates the vehicle deceleration Aw from the signal data input from the deceleration sensors 1. The target deceleration calculator 41 calculates the target deceleration Tg from the stroke of and pressure applied to the brake pedal 10, or from the vehicle speed and the distance to a detected obstruction (including other vehicles). The pressure adjustment speed calculator 45 calculates the speed at which the brake fluid pressure increases or decreases (the pressure adjustment speed) from the vehicle deceleration Aw and target deceleration Tg. The fluid pressure controller driver 46 then controls the fluid pressure controller 50 according to the pressure adjustment speed calculated by the pressure adjustment speed calculator 45.

In this configuration, the deceleration calculator 40 and target deceleration calculator 41 are connected to the pressure adjustment speed calculator 45, which is in turn connected to the fluid pressure controller driver 46 to output the calculated pressure adjustment speed to the fluid pressure controller driver 46.

Based on the pressure adjustment speed input from the pressure adjustment speed calculator 45, the fluid pressure controller driver 46 calculates the brake fluid pressure control command value and outputs said command value to the fluid pressure controller 50, to which it is connected. The fluid pressure controller 50 thus controls the brake fluid pressure to control the braking force of the vehicle.

A first example of the braking force control operation according to the first embodiment of the vehicle braking force controller of the invention shown in FIG. 2 is described below with reference to FIGS. 3 and 4.

Figure 3:
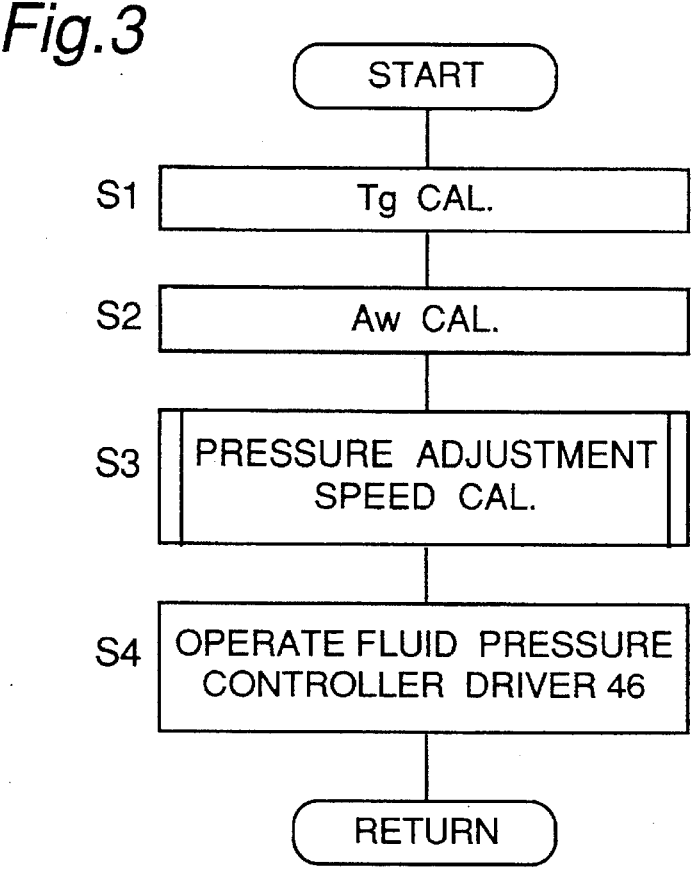
FIG. 3 is a flow chart of a first example of the operation of the vehicle braking force controller according to the first embodiment shown in FIG. 2.

Referring first to the flow chart in FIG. 3, the braking force control computer 4 calculates the target deceleration Tg by means of the target deceleration calculator 41 at step S1; then calculates the vehicle deceleration Aw by means of the deceleration calculator 40 based on the signals from the deceleration sensor 1 (step S2); and then calculates the pressure adjustment speed by means of the pressure adjustment speed calculator 45 based on the calculated target deceleration Tg and the calculated vehicle deceleration Aw (step S3).

At step S4, the pressure adjustment speed calculator 45 outputs the calculated pressure adjustment speed to the fluid pressure controller driver 46, which drives and controls the fluid pressure controller 50 according to the input pressure adjustment speed. Control then loops back to step S1.

The method of calculating the pressure adjustment speed executed by the pressure adjustment speed calculator 45 in step S3 of FIG. 3 is described below with reference to the flow chart of the pressure adjustment speed calculation routine shown in FIG. 4. Note that unless otherwise specified below, all processes executed within the pressure adjustment speed calculation routine in FIG. 4 are executed by the pressure adjustment speed calculator 45.

At step S10 in FIG. 4, the pressure adjustment volume DP for compensating the difference between the target deceleration Tg and the vehicle deceleration Aw is calculated from the vehicle deceleration Aw input from the deceleration calculator 40 and the target deceleration Tg input from the target deceleration calculator 41 according to equation (1) below.

$$DP = k \times (Tg - Aw) \quad (1)$$

where "k" is a constant of proportionality determined from the brake effectiveness characteristics of the vehicle.

The target tracking time TC, which is the time required to adjust the brake fluid pressure the amount determined by the pressure adjustment volume DP, is then calculated (step S11). The pressure adjustment volume DP is then divided by the target tracking time TC to obtain the brake fluid pressure adjustment speed VP (step S12), and the pressure adjustment speed calculation routine terminates.

Figure 4:
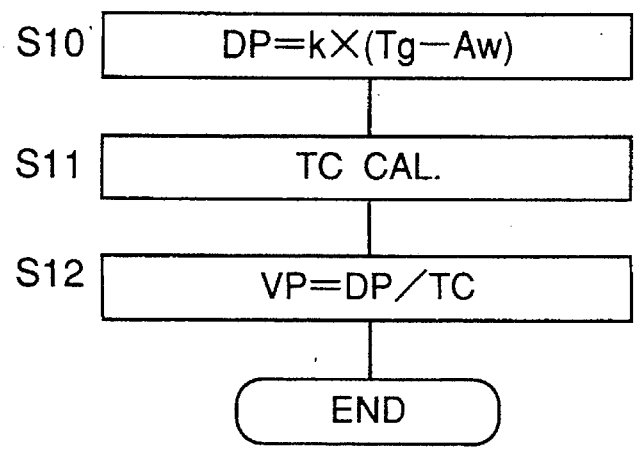
FIG. 4 is a flow chart of the pressure adjustment speed calculation routine shown in the flow chart in FIG. 3.
Figure 5:
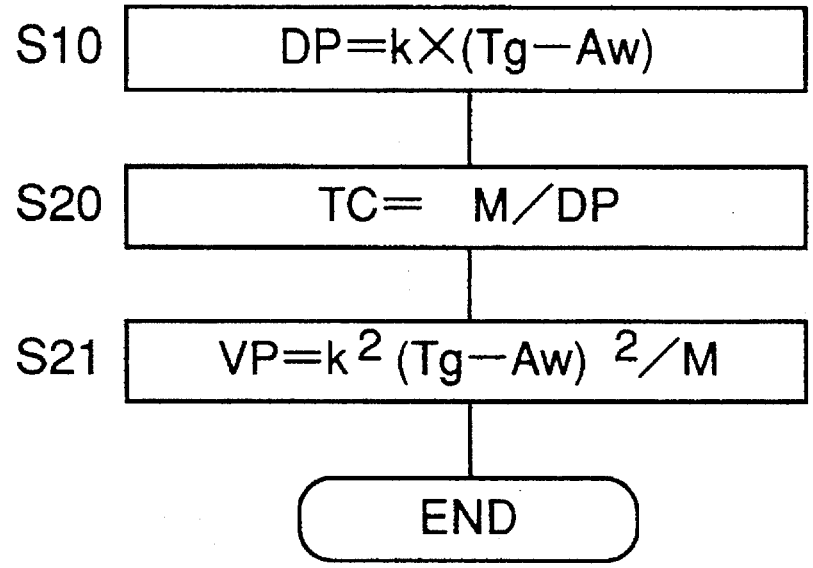
FIG. 5 is a flow chart of the pressure adjustment speed calculation routine in a second example of the operation of the vehicle braking force controller according to the first embodiment shown in FIG. 2.

It is to be noted that the pressure adjustment speed calculation routine shown in FIG. 4 as part of the braking force control operation shown in FIG. 3 may be replaced by the pressure adjustment speed calculation routine shown in FIG. 5 as a second example of the operation of the first embodiment of the vehicle braking force controller according to the present invention.

This second example of the operation of the first embodiment is described below with reference to the flow chart in FIG. 5. Note that identical steps in FIG. 4 and FIG. 5 are identified by the same step numbers, and only the differences between the two flow charts are described below. Note that unless otherwise specified below, all processes executed within the pressure adjustment speed calculation routine in FIG. 5 are executed by the pressure adjustment speed calculator 45.

The flow chart in FIG. 5 differs from that in FIG. 4 in the substitution of steps S20 and S21 in FIG. 5 for steps S11 and S12 in FIG. 4.

After completing step S10, the target tracking time TC is obtained by dividing a constant M, which is determined according to the characteristics of the actuators or brakes of the vehicle by the pressure adjustment volume DP (step S20).

The brake fluid pressure adjustment speed VP is then calculated according to equation (2) below in step S21.

$$VP = DP/TC = DP^2/M = k^2 \times (Tg - Aw)^2/M \quad (2)$$

where "k" is a constant of proportionality determined from the brake effectiveness characteristics of the vehicle.

In this second operating example the value of the target tracking time TC decreases as the pressure adjustment volume DP conversely increases, and increases as the pressure adjustment volume DP decreases. The difference between the target deceleration Tg and vehicle deceleration Aw is therefore great, the value of the pressure adjustment speed VP increases as the pressure adjustment volume DP increases, and the responsiveness of vehicle deceleration therefore improves. The pressure adjustment speed VP also decreases as the difference between the target deceleration Tg and vehicle deceleration Aw decreases, and therefore there is no overshooting of the vehicle deceleration, and the convergence of deceleration improves.

Figure 6:
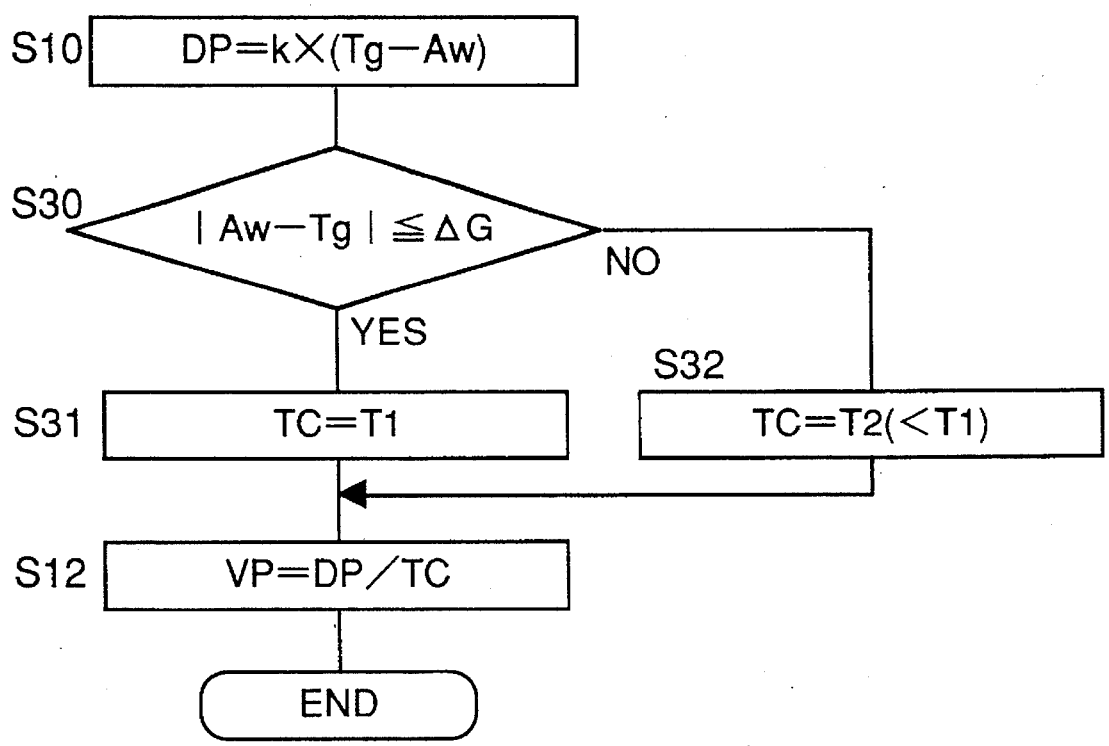
FIG. 6 is a flow chart of the pressure adjustment speed calculation routine in a third example of the operation of the vehicle braking force controller according to the first embodiment shown in FIG. 2.

It is also possible to substitute the pressure adjustment speed calculation routine shown in FIG. 6 for the pressure adjustment speed calculation routines shown in FIGS. 4 and 5 for the first and second examples described above. This is described as the third operating example of the first embodiment of the present invention with reference to the flow chart in FIG. 6 below.

Note that identical steps in FIG. 4 and FIG. 6 are identified by the same step numbers, and only the differences between the two flow charts are described below. Note that unless otherwise specified below, all processes executed within the pressure adjustment speed calculation routine in FIG. 6 are executed by the pressure adjustment speed calculator 45.

The flow chart in FIG. 6 differs from that in FIG. 4 in the substitution of steps S30 to S32 in FIG. 6 for step S11 in FIG. 4.

After completing step S10, it is determined whether the absolute value of the difference, between the vehicle deceleration Aw input from the deceleration calculator 40 and the target deceleration Tg input from the target deceleration calculator 41, is less than or equal to a predetermined value AG (step S30). If it is (YES is returned), control flows to step S31; if not, control flows to step S32.

At step S31, the target tracking time TC, which is the time required to adjust the brake fluid pressure the amount determined by the pressure adjustment volume DP, is set to a predetermined value T1. Control then advances to step S12, after which the routine terminates.

If the absolute value of the difference between the vehicle deceleration Aw and the target deceleration Tg exceeds the predetermined value AG and step S30 returns NO to advance to step S32, the target tracking time TC is set to a predetermined value T2. Predetermined value T2 is less than T1. Control then advances to step S12, after which the routine terminates.

It is to be noted that the values of predetermined values T1 and T2 may be set, for example, such that T2 is 64 msec where T1 is 128 msec.

In this third operating example, the value of the target tracking time TC is set to a high predetermined value to reduce the pressure adjustment speed VP when the absolute value of the difference between the vehicle deceleration Aw and the target deceleration Tg is less than or equal to a predetermined threshold value. As a result, there is no overshooting of the vehicle deceleration, and the convergence of deceleration improves. Furthermore, the value of the target tracking time TC is set to a low predetermined value to increase the pressure adjustment speed VP when the absolute value of the difference between the vehicle deceleration Aw and the target deceleration Tg exceeds a predetermined threshold value. As a result, the pressure adjustment speed VP increases, and the responsiveness of vehicle deceleration therefore improves.

Figure 7:
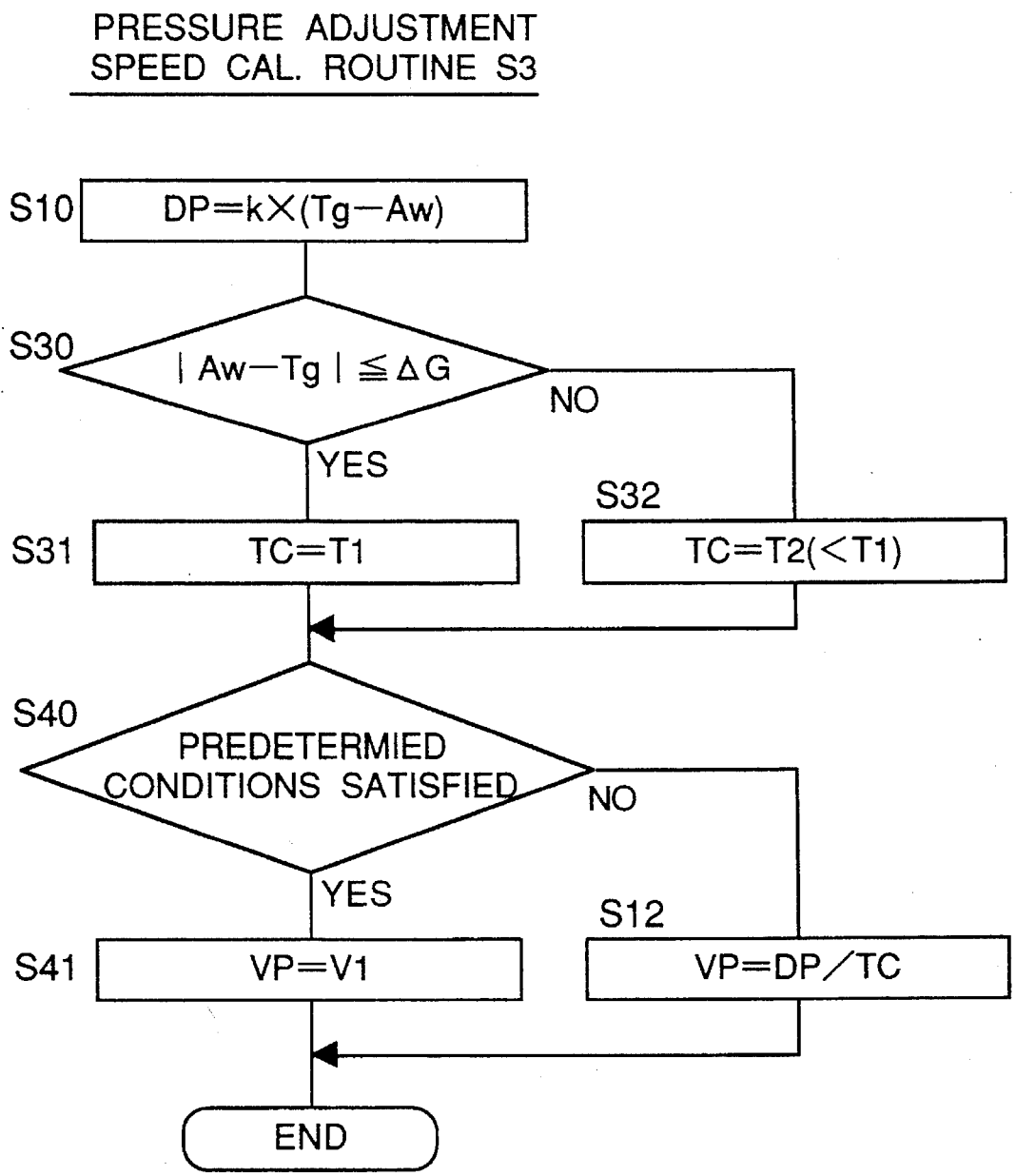
FIG. 7 is a flow chart of the pressure adjustment speed calculation routine in a fourth example of the operation of the vehicle braking force controller according to the first embodiment shown in FIG. 2.

It is also possible to substitute the pressure adjustment speed calculation routine shown in FIG. 7 for the pressure adjustment speed calculation routine of the third operating example shown in FIG. 6 described above. This is described as the fourth operating example of the first embodiment of the vehicle braking force controller according to the present invention with reference to the flow chart in FIG. 7 below.

Note that identical steps in FIGS. 4, 5, and 6 used to describe the first, second, and third operating examples, respectively, of the first embodiment are identified by the same step numbers, and only the differences between the flow chart in FIG. 6 and the flow chart in FIG. 7 are described below. Note that unless otherwise specified below, all processes executed within the pressure adjustment speed calculation routine in FIG. 7 are executed by the pressure adjustment speed calculator 45.

The flow chart in FIG. 7 differs from that in FIG. 6 in the addition of an evaluation step (S40) between steps S31 and S32 and step S12 in FIG. 6, and the addition of another assignment step (S41) such that the value of pressure adjustment speed VP is variably set by means of an assignment step selected dependently upon the result returned by step S40, and the routine then terminates.

Referring to FIG. 7, when step S31 or S32 is completed, it is determined whether certain predetermined conditions have been satisfied since the start of brake pressurization control (step S40). If these conditions have been satisfied (YES is returned), the pressure adjustment speed VP is set to a predetermined value V1 (step S41), and the routine terminates.

If these predetermined conditions have not been satisfied (step S40 therefore returns NO), control steps to step S12 whereby the pressure adjustment speed VP is calculated as described above. The routine then terminates.

The value of this predetermined value V1 is preferably great enough to obtain good vehicle deceleration response, e.g., the value calculated by step S12, the maximum pressurization rate used, or a value of 300 bar/sec or greater.

In this fourth operating example, the pressurization rate of the brake fluid pressure is set to a high value when certain predetermined conditions are satisfied after brake fluid pressurization by the brake fluid pressure control system begins, and response is therefore good at the rise (start) of vehicle deceleration. Furthermore, when these conditions are not satisfied after brake fluid pressurization begins, the brake fluid pressurization rate is set to a value lower than when control began, thereby preventing vehicle deceleration overshoot and obtaining good deceleration convergence.

Figure 8:
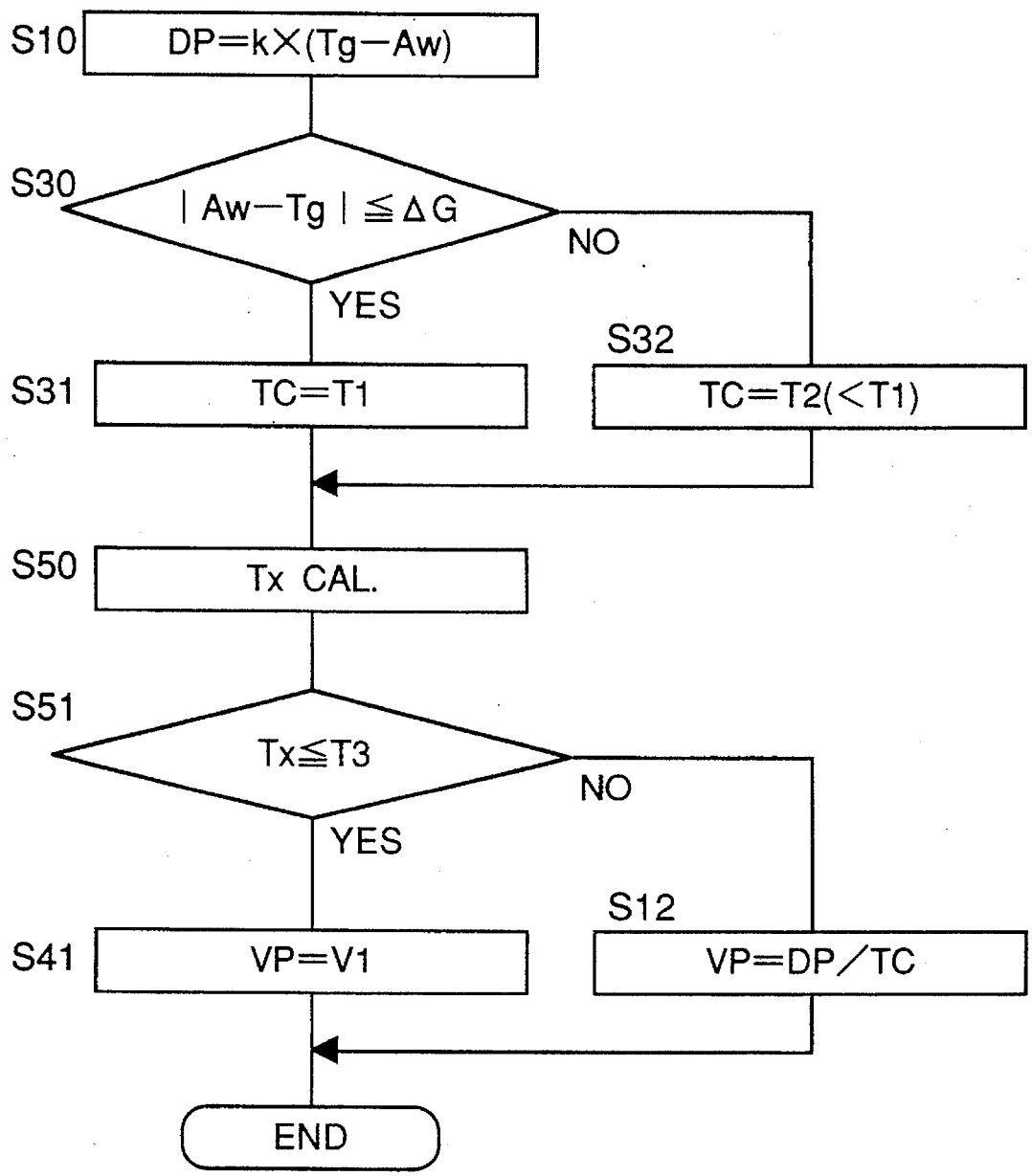
FIG. 8 is a flow chart of the pressure adjustment speed calculation routine in a fifth example of the operation of the vehicle braking force controller according to the first embodiment shown in FIG. 2.

It is also possible to substitute the pressure adjustment speed calculation routine shown in FIG. 8 for the pressure adjustment speed calculation routine of the fourth operating example shown in FIG. 7 described above. This is described as the fifth operating example of the first embodiment of the vehicle braking force controller according to the present invention with reference to the flow chart in FIG. 8 below.

Note that identical steps in FIG. 8 and the first through fourth operating examples of the first embodiment described above are identified by the same step numbers, and only the differences between the flow chart in FIG. 7 and the flow chart in FIG. 8 are described below. Note that unless otherwise specified below, all processes executed within the pressure adjustment speed calculation routine in FIG. 8 are executed by the pressure adjustment speed calculator 45.

The flow chart in FIG. 8 differs from that in FIG. 7 by the addition of an additional calculation step S50 between steps S31, S32 and step S40 in FIG. 7, and the substitution of evaluation step S51 for step S40 in FIG. 7.

Referring to FIG. 8, once step S31 or step S32 is completed, a time Tx elapsed from the start of brake pressurization control is calculated (step S50) based on a timer (not shown in the figures).

It is then determined whether the time Tx from the start of pressurization is less than or equal to a setting T3 determined according to the target deceleration Tg. If time Tx is less than or equal to T3 (YES is returned), step S41 is executed to set the pressure adjustment speed VP, and the routine terminates. If time Tx exceeds T3 (NO is returned), step S12 is executed to calculate the pressure adjustment speed VP, and the routine terminates.

In this fifth operating example, the brake fluid pressurization rate is set to a large value when the time Tx elapsed from the start of brake pressurization control by the brake fluid pressure control system is within a time T3 set according to the target deceleration Tg. As a result, response is good at the rise (start) of vehicle deceleration. On the other hand, the brake fluid pressurization rate is set to a value lower than when control began if the time Tx elapsed from the start of brake pressurization control exceeds the threshold time T3, thereby preventing vehicle deceleration overshoot and obtaining good deceleration convergence.

Figure 9:
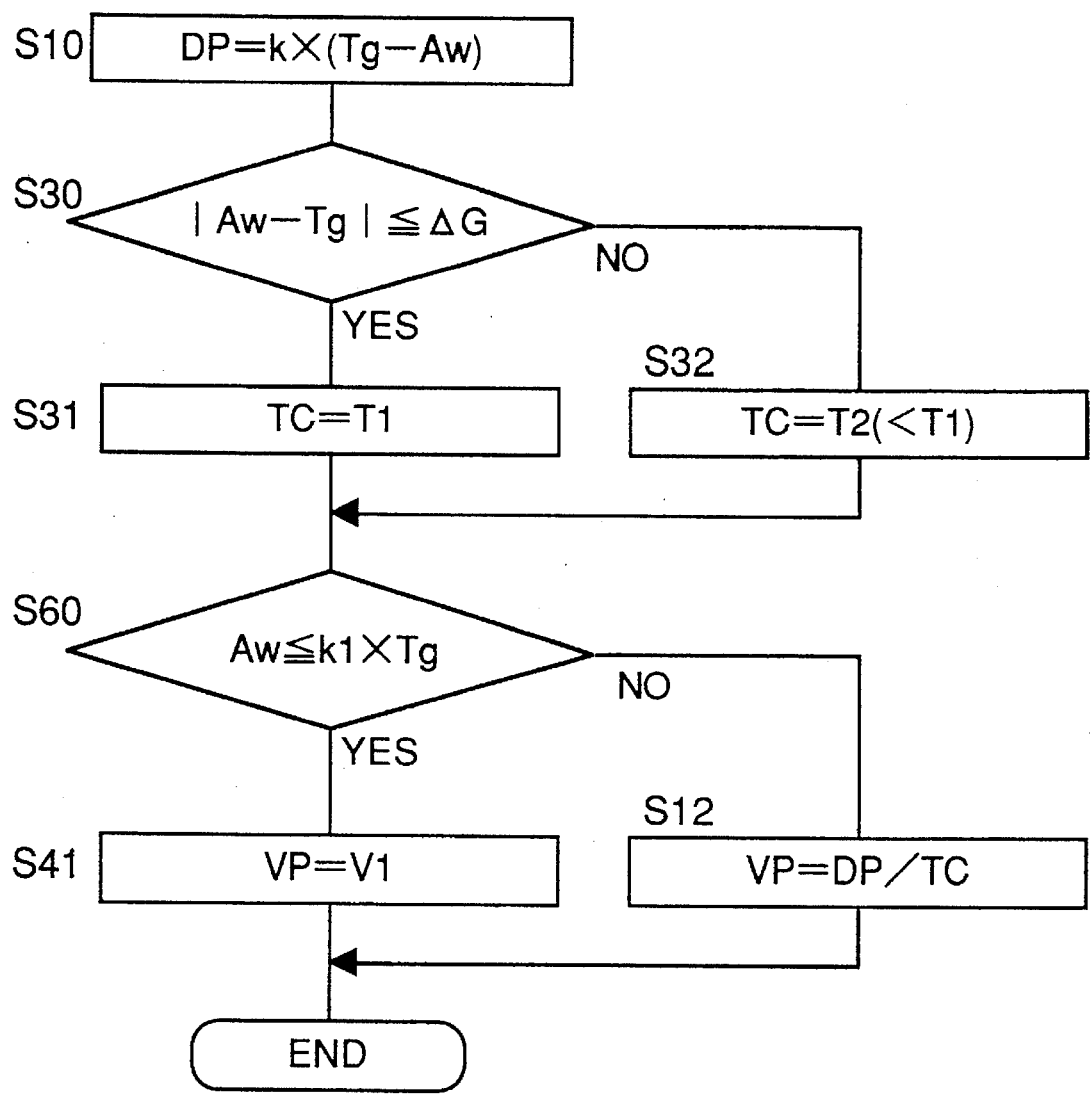
FIG. 9 is a flow chart of the pressure adjustment speed calculation routine in a sixth example of the operation of the vehicle braking force controller according to the first embodiment shown in FIG. 2.

It is also possible to substitute the pressure adjustment speed calculation routine shown in FIG. 9 for the pressure adjustment speed calculation routine of the fourth operating example shown in FIG. 7, described above. This is described as the sixth operating example of the first embodiment of the vehicle braking force controller according to the present invention with reference to the flow chart in FIG. 9 below.

Note that identical steps in FIG. 9 and the first through fourth operating examples of the first embodiment described above and shown in FIGS. 4–7 are identified by the same step numbers, and only the differences between the flow chart in FIG. 7 and the flow chart in FIG. 9 are described below. Note that unless otherwise specified below, all processes executed within the pressure adjustment speed calculation routine in FIG. 9 are executed by the pressure adjustment speed calculator 45.

The flow chart in FIG. 9 differs from that in FIG. 7 in the substitution of evaluation step S60 for step S40 in FIG. 7.

Referring to FIG. 9, once step S31 or step S32 is 10 completed, it is determined whether the vehicle deceleration Aw is less than or equal to a particular percentage of the target deceleration Tg (step S60). This percentage of the target deceleration Tg is determined by multiplying Tg by a predetermined value k1 where 0<k1<1.

If the vehicle deceleration Aw is within this range (YES is returned), step S41 is executed to set the pressure adjustment speed VP, and the routine terminates. If it is not (NO is returned), step S12 is executed to calculate the pressure adjustment speed VP, and the routine terminates.

In this sixth operating example, the brake fluid pressurization rate is set to a large value until the vehicle deceleration reaches a predetermined percentage of the target deceleration after brake pressurization by the brake fluid pressure control system starts. As a result, response is good at the rise (start) of vehicle deceleration. On the other hand, the brake fluid pressurization rate is set to a value lower than when control began if the vehicle deceleration exceeds this predetermined percentage of the target deceleration, thereby preventing vehicle deceleration overshoot and obtaining good deceleration convergence.

Figure 10:
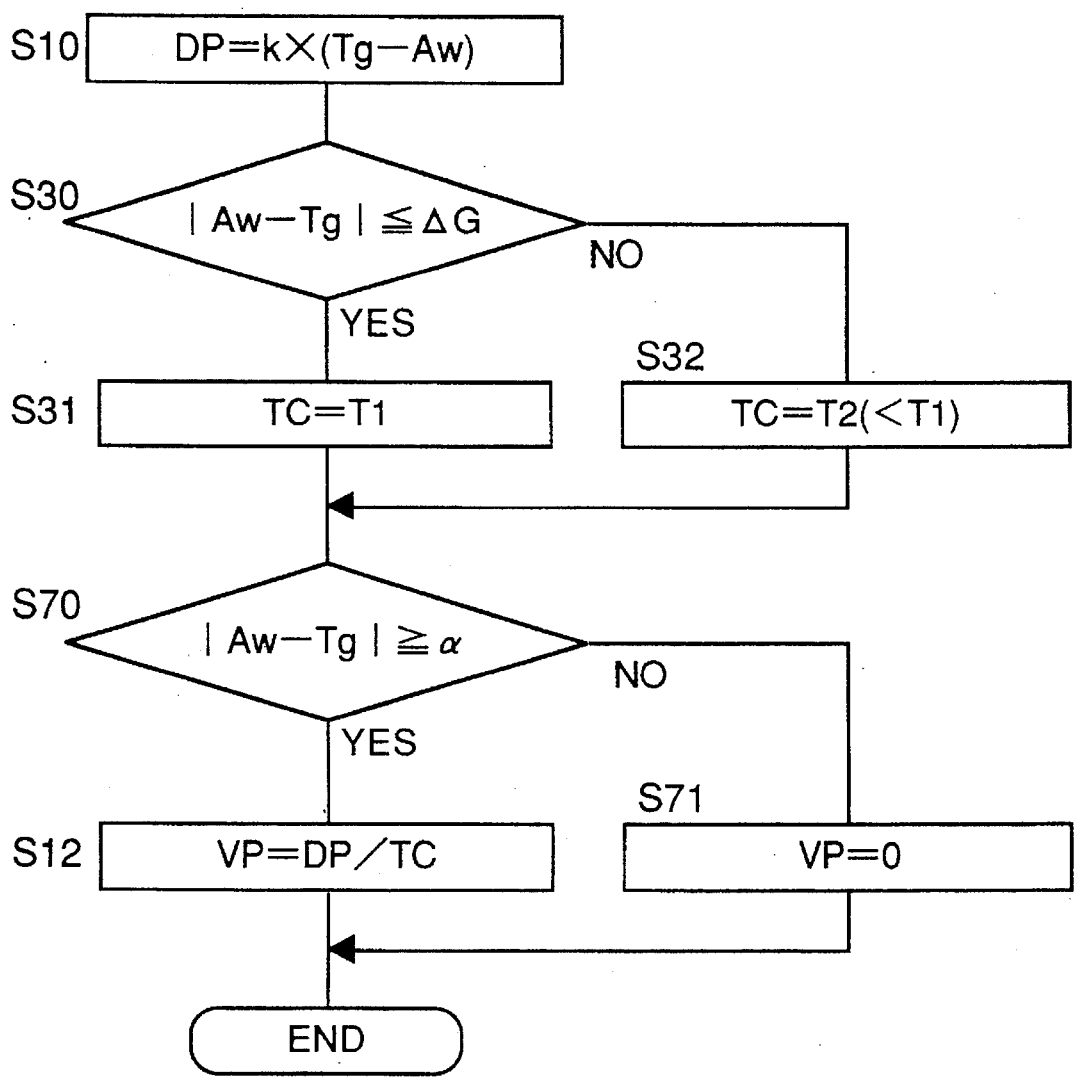
FIG. 10 is a flow chart of the pressure adjustment speed calculation routine in a seventh example of the operation of the vehicle braking force controller according to the first embodiment shown in FIG. 2.

It is also possible to substitute the pressure adjustment speed calculation routine shown in FIG. 10 for the pressure adjustment speed calculation routine of the third operating example of the first embodiment shown in FIG. 6. The seventh operating example, thus obtained by so substituting the pressure adjustment speed calculation routine shown in FIG. 10, is described below as the seventh operating example of the present invention.

Note that identical steps in FIG. 10 and the first through sixth operating examples of the first embodiment described above and shown in FIGS. 4–9 are identified by the same step numbers, and only the differences between the flow chart of the third operating example shown in FIG. 6 and the flow chart in FIG. 10 are described below. Unless otherwise specified below, all processes executed within the pressure adjustment speed calculation routine in FIG. 10 are executed by the pressure adjustment speed calculator 45.

The flow chart in FIG. 10 differs from that in FIG. 6 in the addition of an evaluation step (S70) between steps S31 and S32 and step S12 in FIG. 6, and the addition of another assignment step (S71) such that the value of the pressure adjustment speed VP is variably set by means of an assignment step selected dependently upon the result returned by step S70, and the routine then terminates.

Referring to FIG. 10, once step S31 or step S32 is completed, it is determined whether the absolute value of the difference between the vehicle deceleration Aw and the target deceleration Tg is greater than or equal to a predetermined value $\alpha$ (step S70). If it is (YES is returned), the pressure 10 adjustment speed VP is calculated in step S12, and the routine terminates.

If the absolute value of the difference between the vehicle deceleration Aw and the target deceleration Tg is less than the predetermined value $\alpha$ (NO is returned), the pressure adjustment speed VP is set to zero (0) as a means of holding the brake fluid pressure, and the routine then terminates.

In this seventh operating example, the vehicle braking force controller operates to maintain the brake fluid pressure when the difference between the detected vehicle deceleration and the calculated target deceleration is within a predetermined threshold range. As a result, vehicle deceleration overshoot is prevented, and good deceleration convergence is obtained.

Figure 11:
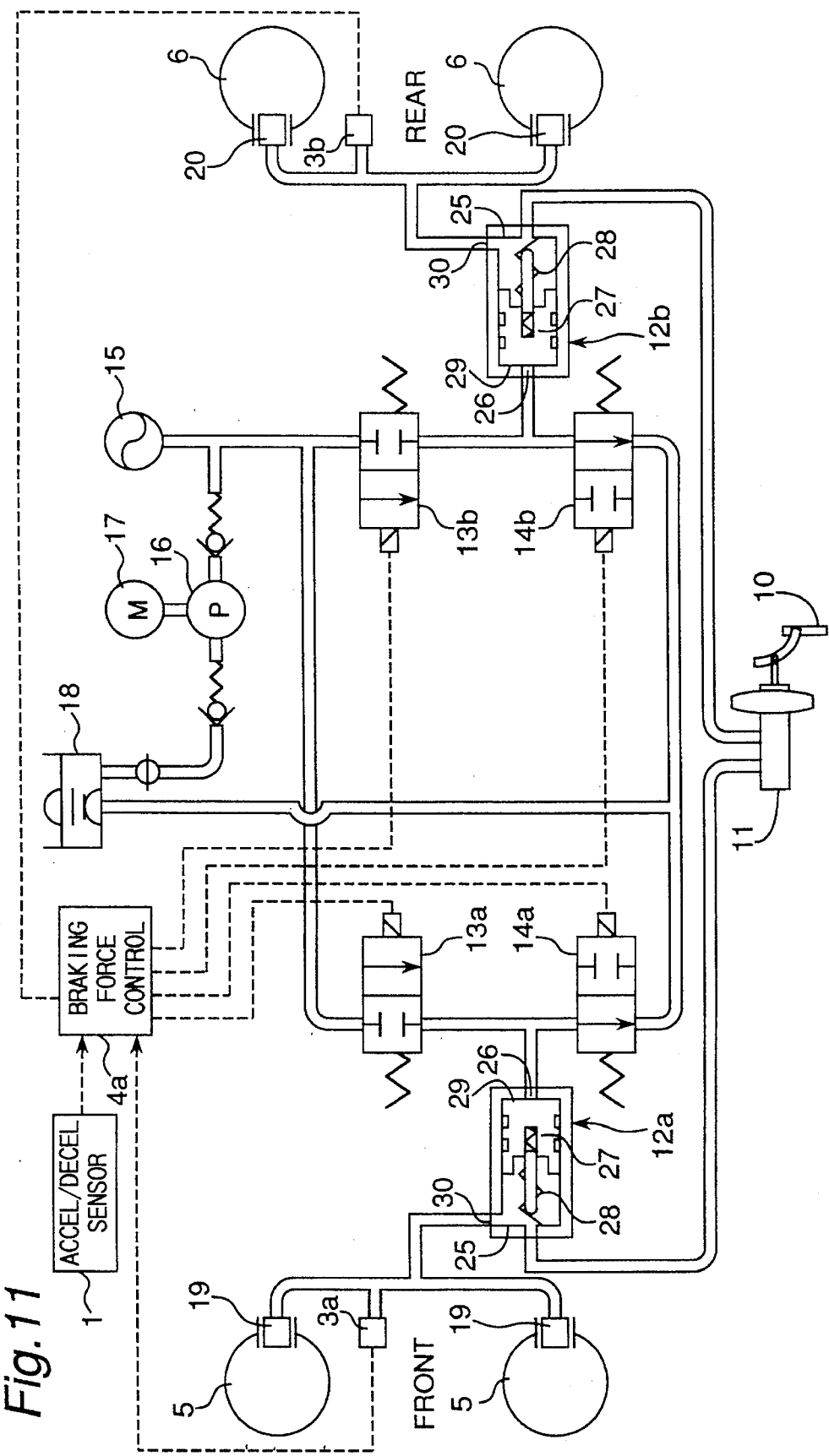
FIG. 11 is a simple system diagram of a vehicle braking force control system applying the vehicle braking force controller of the second embodiment of the invention in a four-wheeled vehicle.

FIG. 11 is a simple system diagram of a vehicle braking force control system applying the vehicle braking force controller of the second embodiment of the invention in a four-wheeled vehicle. Note that like reference numbers identify like parts in FIGS. 1 and 11, and further description thereof is omitted below. Only the differences between the second embodiment shown in FIG. 11 and the first embodiment shown in FIG. 1 are described below.

Referring to FIG. 11, the second embodiment differs from the first in the disposition of fluid pressure sensors 3a and 3b for detecting the brake fluid pressure and functioning as the brake fluid pressure detectors of the claims. One fluid pressure sensor 3a detects the brake fluid pressure of the front wheel brake system, and the other fluid pressure sensor 3b detects the brake fluid pressure of the rear wheel brake system. Both fluid pressure sensors 3a and 3b are further connected to the braking force control computer 4, and together with the braking force control computer 4 form braking force control computer 4a.

The braking force control computer 4a calculates the brake fluid pressure control command value for controlling the drive of solenoid valves 13a, 13b, 14a and 14b. The brake fluid pressure control command value is a control signal calculated from the signal data input from the deceleration sensor 1 and the fluid pressure sensors 3a and 3b for increasing, decreasing, or holding the brake fluid pressure.

Figure 12:
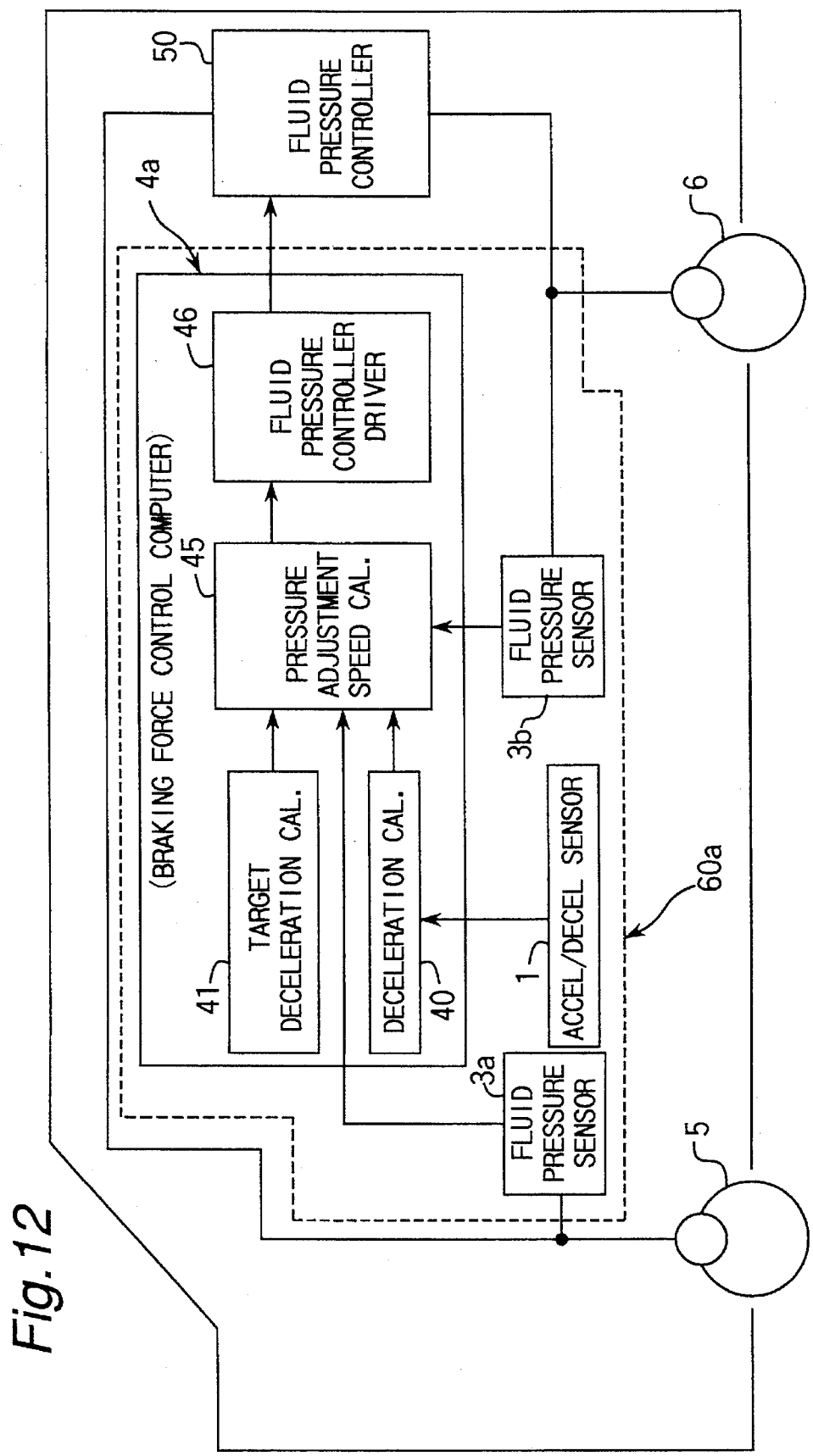
FIG. 12 is a block diagram of a vehicle braking force controller according to the second embodiment of the present invention.

The second embodiment of the vehicle braking force controller according to the present invention used in the vehicle braking force control system shown in FIG. 11 is described next below with reference to FIG. 12. Note that like parts are referenced by like reference numbers in FIGS. 1, 2, and 12, and further description of such like parts is omitted below. Only the differences between the second embodiment in FIG. 12 and the first embodiment shown in FIG. 2 are described below.

This second detector differs from the first in the disposition of fluid pressure sensors 3a and 3b in the braking force controller 60, thus forming braking force controller 60a. Note that these fluid pressure sensors 3a and 3b are connected to the pressure adjustment speed calculator 45 of the braking force control computer 4 in the first embodiment, thus making up the braking force control computer 4a described above.

Figure 13:
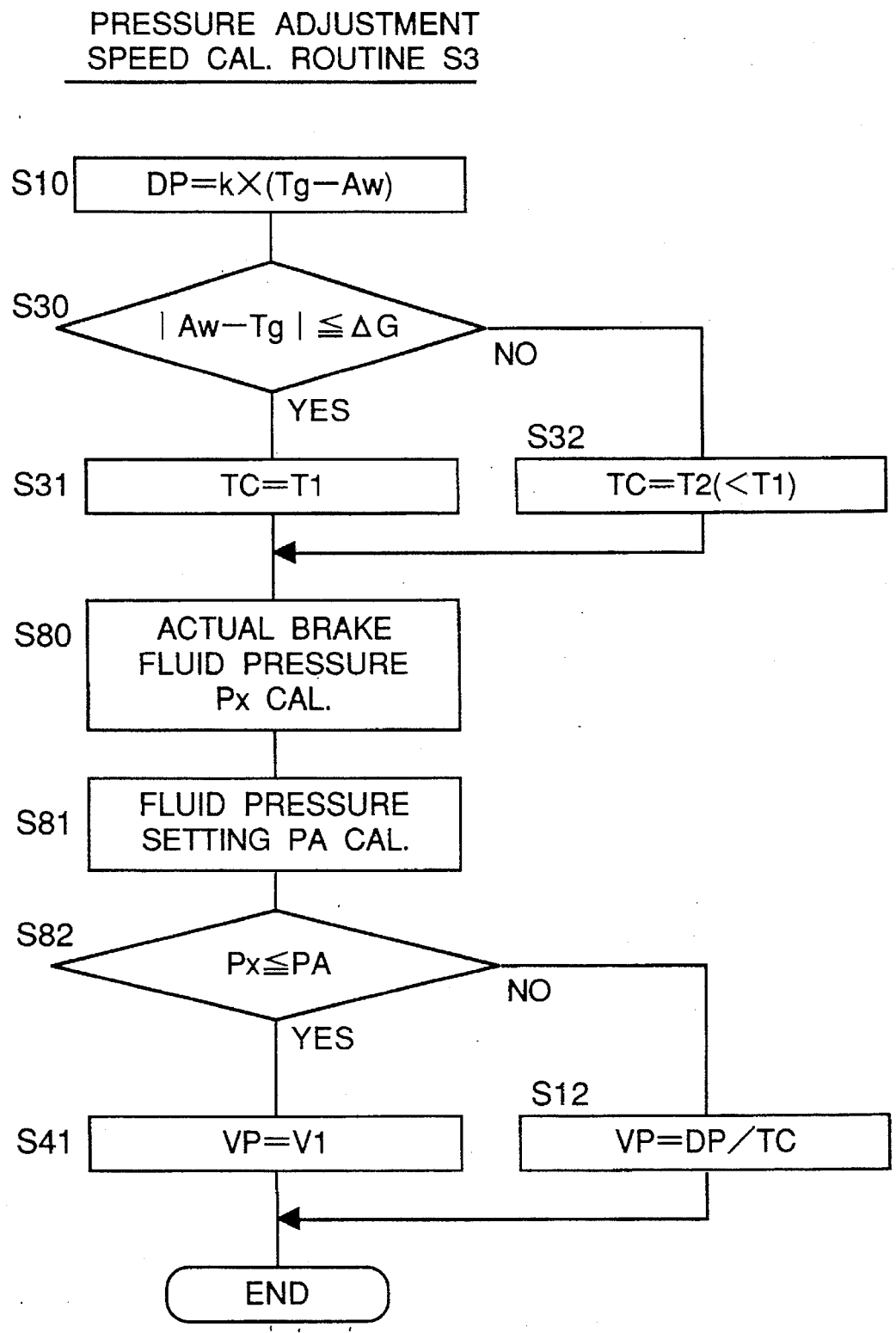
FIG. 13 is a flow chart of the pressure adjustment speed calculation routine in the operation of the vehicle braking force controller according to the second embodiment shown in FIG. 12.

The operation of this second embodiment differs from the operation of the fourth operating example of the first embodiment shown in the flow charts in FIGS. 3 and 7 in the substitution of the braking force control evaluation routine shown in FIG. 13 for that shown in FIG. 7. Note that like steps in FIGS. 7 and 13 are identified by like step numbers, and only the differences are described below. Note that unless otherwise specified below, all processes executed within the pressure adjustment speed calculation routine in FIG. 13 are executed by the pressure adjustment speed calculator 45.

The routine shown in FIG. 13 differs from that in FIG. 7 in the addition of two calculation steps S80 and S81 between steps S31, S32 and step S40 in FIG. 7, and the substitution of evaluation step S82 for step S40 in FIG. 7.

Referring to FIG. 13, once step S31 or step S32 is completed, an actual brake fluid pressure Px, which is the actual fluid pressure in the brake system, is calculated based on the signal data input from the fluid pressure sensors 3a and 3b (step S80).

The fluid pressure setting PA is then calculated from the target deceleration Tg according to a predetermined method (step S81). The fluid pressure setting PA is obtained by calculating the fluid pressure corresponding to the target deceleration Tg from the brake effectiveness characteristics of the vehicle, and then setting the fluid pressure setting PA to 50% or 80% of this calculated fluid pressure.

It is then determined whether the actual brake fluid pressure Px is less than or equal to the fluid pressure setting PA (step S82). If it is (YES is returned), the pressure adjustment speed VP is set to a predetermined value (step S41), and the routine terminates. If the actual brake fluid pressure Px exceeds the fluid pressure setting PA (NO is returned), the pressure adjustment speed VP is calculated (step S12), and the routine terminates.

In the operation of this second embodiment, the pressurization rate of the brake fluid pressure is set to a high value from the start of brake fluid pressurization by the vehicle braking force controller until the actual brake fluid pressure Px of the wheels reaches a predetermined value. As a result, response is good at the rise (start) of vehicle deceleration. Furthermore, the brake fluid pressurization rate is set to a value lower than when control began when the actual brake fluid pressure Px of the wheels exceeds a predetermined value. As a result, vehicle deceleration overshoot is prevented and good deceleration convergence is obtained.

Figure 14:
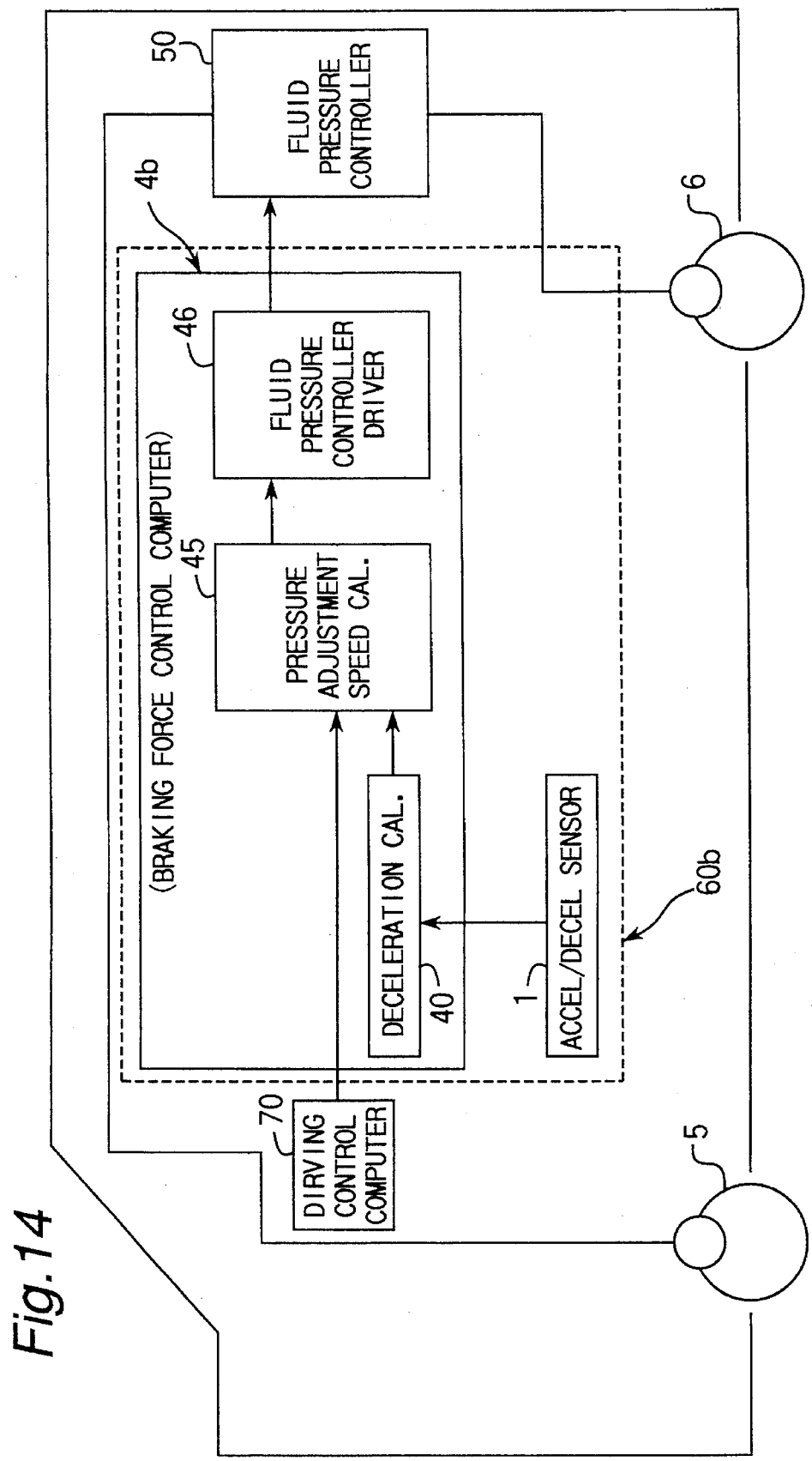
FIG. 14 is a block diagram of a vehicle braking force controller according to the third embodiment of the present invention.

It is to be noted that while the first and second embodiments of the vehicle braking force controller according to the present invention have been described as calculating the target deceleration Tg by means of the target deceleration calculator in the braking force control computer, the target deceleration Tg may also be calculated by means external to the braking force control apparatus. The third embodiment of the present invention as shown in FIG. 14 thus calculates the target deceleration Tg by means external to the braking force control apparatus. Note that like reference numbers identify like parts in FIG. 14 and the first embodiment shown in FIG. 2, and further description thereof is omitted below. Only the differences between the first embodiment shown in FIG. 1 and the third embodiment shown in FIG. 14 are described below.

This third embodiment differs from the first embodiment shown in FIG. 2 by the omission of the target deceleration calculator 41 from the braking force control computer 4. The braking force control computer 4 is thus referred to as braking force control computer 4b, and the braking force controller as 60b. A driving control computer 70 is thus provided externally to the braking force controller 60b for appropriately outputting to the various control apparatuses the acceleration, steering, and deceleration commands. The driving control computer 70 is connected to the pressure adjustment speed calculator 45 of the braking force control computer 4b.

It should be further noted that the driving control computer 70 may be disposed internally or externally to the vehicle. When installed externally to the vehicle, the driving control computer 70 communicates the target deceleration Tg as signal data to the pressure adjustment speed calculator 45. When installed internally to the vehicle as shown in FIG. 14, the driving control computer 70 outputs the target deceleration Tg as signal data comprising electrical signal values to the pressure adjustment speed calculator 45.

The operation of the first embodiment and this third embodiment differs only in the calculation of the target deceleration Tg. Specifically, the target deceleration Tg is calculated by the target deceleration calculator 41 and output therefrom to the pressure adjustment speed calculator 45 in the first operating example of the first embodiment described above. In this third embodiment shown in FIG. 14, however, the target deceleration Tg is calculated by the driving control computer 70 and output therefrom to the pressure adjustment speed calculator 45. All other aspects of vehicle braking force controller operation are identical, and further description thereof is omitted below.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle braking force controller for controlling braking force of a vehicle by changing brake fluid pressure effected by a fluid pressure controller, comprising:

deceleration detection means for detecting and outputting a vehicle deceleration;

target deceleration calculation means for calculating a target deceleration of the vehicle;

pressure adjustment speed calculation means for calculating a pressure adjustment speed at which the brake fluid pressure changes using the calculated target deceleration and the detected vehicle deceleration; and fluid pressure controller drive means for controlling the operation of the fluid pressure controller according to the calculated pressure adjustment speed;

said pressure adjustment speed calculation means calculating the brake fluid pressure adjustment speed using a brake fluid pressure adjustment volume which is commensurate with a difference between the detected vehicle deceleration and the calculated target deceleration, and a target tracking time representing a time required to adjust the brake fluid pressure with said pressure adjustment volume.

2. A vehicle braking force controller according to claim 1, wherein said pressure adjustment speed calculation means comprises means for detecting whether or not an absolute value of said difference between the detected vehicle deceleration and the calculated target deceleration is not greater than a predetermined value, and means for holding the brake fluid pressure when said difference is not greater than said predetermined value.

3. A vehicle braking force controller according to claim 1, wherein said pressure adjustment speed calculation means comprises means for detecting whether or not predetermined conditions are satisfied from the start of brake fluid pressurization by the vehicle braking force controller, and means for setting the brake fluid pressure adjustment speed at a value greater than a predetermined value when said predetermined conditions are satisfied.

4. A vehicle braking force controller for controlling braking force of a vehicle by changing brake fluid pressure effected by a fluid pressure controller, comprising:

deceleration detection means for detecting and outputting a vehicle deceleration;

target deceleration calculation means for calculating a target deceleration of the vehicle;

brake fluid pressure detection means for detecting an actual brake fluid pressure;

pressure adjustment speed calculation means for calculating a pressure adjustment speed at which the brake fluid pressure changes using the calculated target deceleration and the detected vehicle deceleration; and fluid pressure controller drive means for controlling the operation of the fluid pressure controller according to the calculated pressure adjustment speed;

said pressure adjustment speed calculation means comprising means for calculating a fluid pressure setting based on said target deceleration, means for detecting whether or not said actual brake fluid pressure is not greater than said fluid pressure setting, and means for setting the brake fluid pressure adjustment speed at a value greater than a predetermined value from the start of brake fluid pressurization by the vehicle braking force controller until the brake fluid pressure detected by said brake fluid pressure detection means reaches a fluid pressure setting set according to the target deceleration.

5. A vehicle braking force control method for controlling braking force of a vehicle by changing brake fluid pressure effected by a fluid pressure controller, said method comprising the steps of:

(a) detecting and outputting a vehicle deceleration;

(b) calculating a target deceleration of the vehicle;

(c) calculating a pressure adjustment speed at which the brake fluid pressure changes using the calculated target deceleration and the detected vehicle deceleration, said pressure adjustment speed being calculated using a brake fluid pressure adjustment volume which is commensurate with a difference between the detected vehicle deceleration and the calculated target deceleration, and a target tracking time representing a time required to adjust the brake fluid pressure with said pressure adjustment volume; and (d) controlling the operation of the fluid pressure controller according to the calculated pressure adjustment speed.

* * * * *